April 1, 1941. D. G. SMELLIE 2,237,064
REFRIGERATION
Filed July 20, 1938 2 Sheets-Sheet 2

INVENTOR
Donald G. Smellie
BY
Harry S. Dumasse
ATTORNEY

Patented Apr. 1, 1941

2,237,064

UNITED STATES PATENT OFFICE 2,237,064

REFRIGERATION

Donald G. Smellie, Canton, Ohio, assignor to The Hoover Company, North Canton, Ohio, a corporation of Ohio Application July 20, 1938, Serial No. 220,199

22 Claims. (Cl. 62—5)

This invention relates to the art of refrigeration and more particularly to a novel control mechanism designed for use with refrigerating systems.

According to the invention there is provided a refrigerating control mechanism which will normally control a refrigerating system, which will automatically defrost the refrigerating system, and which may be varied in order that the temperature limits within which the refrigerating system is maintained may be altered at will by the operator. The apparatus is designed and constructed in such fashion that a single thermostatic element simultaneously functions to regulate the apparatus for normal operation and to de-energize the apparatus when a frost coat of an exactly predetermined depth is deposited upon the evaporating element of the refrigerating system.

Previous frost depth responsive automatic defrosting mechanisms have been provided with a separate thermostat operated to render the refrigerating system inoperative when contacted by the frost coat formed on the evaporator. These devices possessed the disadvantage that they require a defrosting thermostat separate and distinct from the normal controlling thermostat, thereby complicating the apparatus and increasing the cost thereof. Additionally, the defrosting thermostat in prior devices has been operated by contact with the frost coat on the evaporator but they have not been accurate because of the tendency of the frost coat to cup around the thermal element, which cupping occurs to a greater or lesser extent at different times depending upon the nature of the particular frost coat and the thermal condition thereof.

According to the present invention there is provided a thermostatic control element which will be brought into a condition of thermal equilibrium with respect to the frost coat without affecting the normal controlling function thereof and will then rapidly operate to de-energize the refrigerating system when the frost coat reaches an accurately predetermined depth.

It is a further object of the invention to provide a refrigerating control mechanism of the above mentioned character which is so arranged that the defrosting mechanism responds to an accurately predetermined depth of frost and which will not return the apparatus to normal operation until the frost responsive thermostatic element has been freed of frost thereby insuring complete removal of the frost coat.

Other objects and advantages of the invention will become apparent as the description proceeds when taken in connection with the accompanying drawings, in which.

The present control mechanism is applicable to any desired type of refrigerating system, but for purposes of description and illustration it is here disclosed as the same is applied to a continuous three-fluid absorption refrigerating system of the type utilizing a gas burner to generate refrigerant vapor and a circulating motor for an inert medium.

Figure 1:
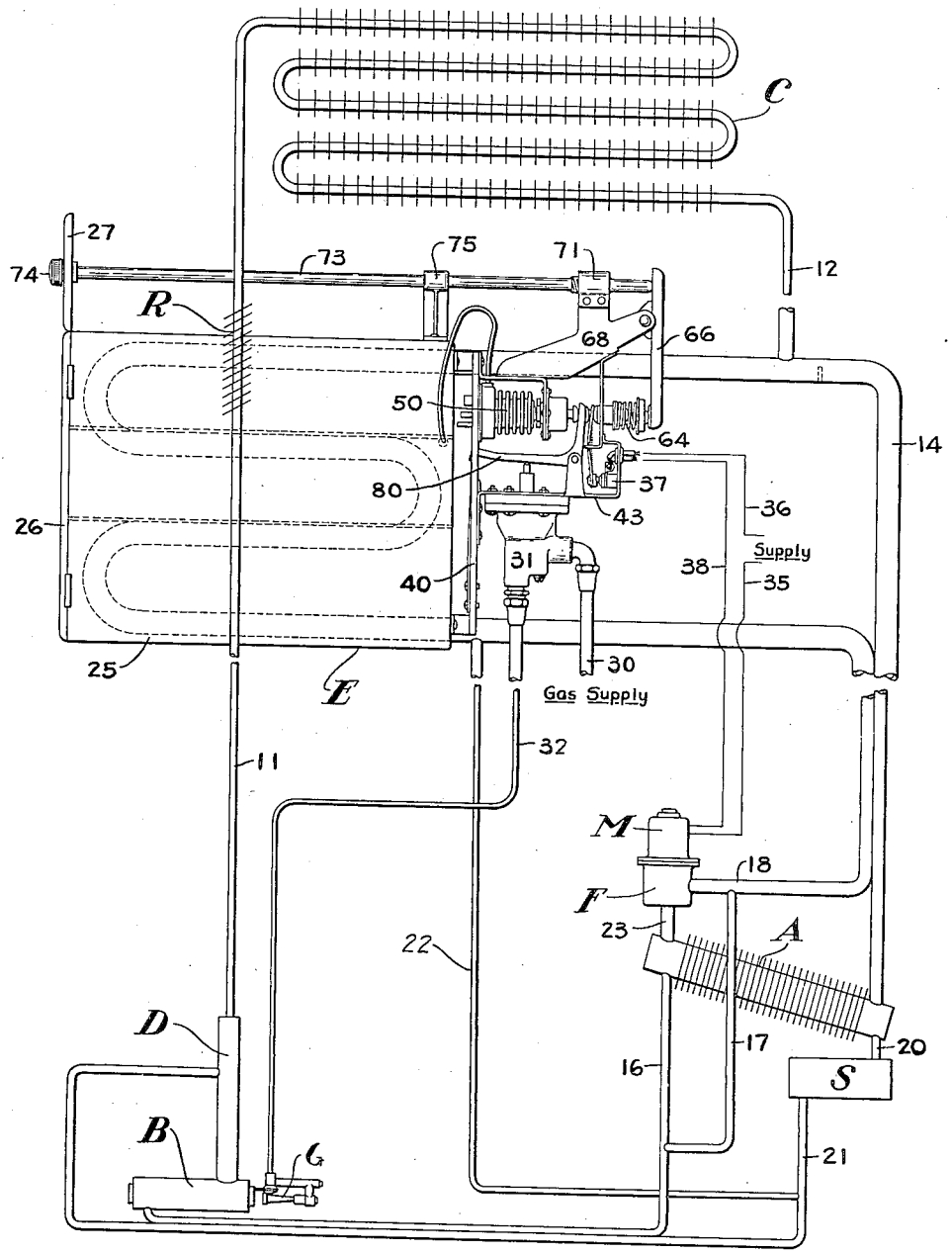
Figure 1 is a schematic representation of one embodiment of the invention as the same is applied to an absorption refrigerating system. Certain portions of this apparatus are drawn on a scale larger than that utilized to illustrate other portions thereof.

Referring now to Figure 1, there is disclosed a refrigerating system comprising a boiler B, an analyzer D, an air-cooled rectifier R, an air-cooled condenser C, an enclosed evaporator E, an air-cooled absorber A, a solution reservoir S, a gas burner G for heating the boiler B, and a circulating fan F which is driven by an electrical motor M. These elements are suitably interconnected by various conduits to form a refrigerating system including a plurality of gas and liquid circuits to which more detailed reference will be made hereinafter.

The above described refrigerating system will be charged with a suitable refrigerant, such as ammonia, a suitable absorbent, such as water, and a suitable inert pressure equalizing medium, such as nitrogen.

The application of heat to the boiler liberates refrigerant vapor from the strong solution therein, which vapor then passes upwardly through the analyzer D in counterflow relationship to strong solution flowing downwardly therethrough. Further refrigerant vapor is generated in the analyzer, the heat of vaporization being supplied by condensation of the vapor of absorption solution generated in the boiler. The refrigerant vapor is conveyed from the upper portion of the analyzer D to the upper portion of the air-cooled condenser C by means of a conduit 11 which includes the rectifier R. The rectifier causes condensation of any vapor of absorption solution which may pass through the analyzer D. The refrigerant vapor is converted to the liquid phase in the condenser by heat exchange with cooling air flowing thereover and is discharged through a conduit 12 into an inert gas conduit 14 which connects to the upper portion of the evaporator E.

The weak solution formed in the boiler by the generation of refrigerant vapor is conveyed therefrom to the upper portion of the inclined tubular absorber A by a conduit 16. It is apparent that the upper portions of the absorber are at an elevation considerably above the liquid level in the boiler-analyzer system; therefore, some means must be provided to elevate the weak solution thereinto. For this purpose a small bleed conduit 17 is connected between the gas discharge conduit 18 of the circulating fan F and the conduit 16 below the normal liquid level prevailing therein, whereby the weak solution is elevated into the absorber by gas lift action. In the absorber the weak solution flows downwardly by gravity in counterflow relationship to a mixture of pressure equalizing medium and refrigerant vapor flowing upwardly through the absorber. The refrigerant vapor content of the pressure equalizing medium is absorbed in the absorption solution and the heat of absorption is rejected by the fins on the exterior surface of the absorber vessel to the cooling air flowing thereover. The absorption of the refrigerant vapor content of the pressure equalizing medium refrigerant vapor mixture in the absorber produces rich solution which is discharged in the lower portion of the absorber vessel through a conduit 20 into the solution reservoir S. The strong solution is conveyed from the solution reservoir S to the upper portion of the analyzer D through a conduit 21 which is in heat transfer relationship with the weak solution conduit 16 previously described.

The lean pressure equalizing medium formed in the absorber is conveyed from the upper end thereof through a conduit 23 into the suction inlet of the fan F in which it is placed under pressure and is forced through the conduit 18 into the lower portion of the evaporator E. The evaporator E may be of any desired type of construction and may include a finned box-cooling element if desired. As illustrated, the evaporator E is of the tubular type which is arranged to provide a plurality of horizontal sections upon which suitable trays may be rested for supporting ice fast-freezing trays. The pressure equalizing medium flows upwardly through the evaporator E in counterflow relationship to the liquid refrigerant flowing downwardly therethrough by gravity. The liquid refrigerant evaporates into the pressure equalizing medium to produce useful refrigeration. The rich pressure equalizing medium refrigerant vapor mixture thus formed is conveyed from the upper portion of the evaporator E through the conduit 14 into the lower portion of the absorber A through which it flows counter to the lean solution in the manner described previously. The conduits 14 and 18 are in heat exchange relationship as illustrated. The evaporator is drained to the strong solution return line by a drain conduit 22.

The evaporator E is preferably enclosed in a suitable casing element 25 which is provided with a hinged door 26 and an upstanding control panel 27. Any desired construction of evaporator may be utilized in accordance with the present invention.

Figure 2:
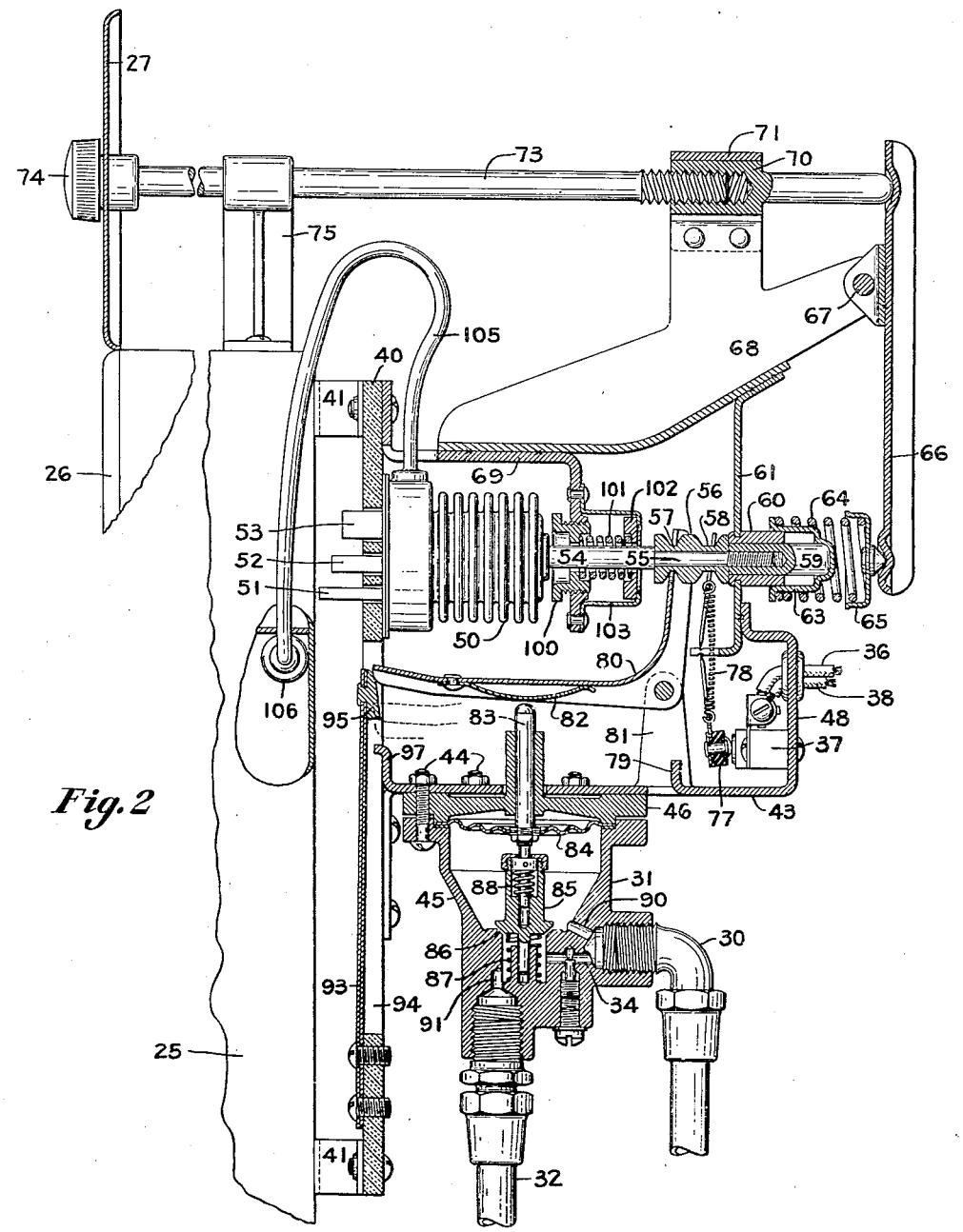
Figure 2 is an enlarged partial sectional elevation of the control mechanism embodying the present invention.

Referring now to Figures 1 and 2, the control mechanism will be described in detail.

Gas is supplied to the burner G through a conduit 30, a control valve 31, and a conduit 32. The burner G includes a suitable thermostatic safety cut-off mechanism which will prevent the supply of gas thereto in the event that the small igniting or pilot flame normally carried on the burner is extinguished. In order to insure a supply of gas to the burner for this small flame, a small by-pass 34 is provided in the body of the valve 31 as shown in Figure 2.

Electrical energy is supplied to the circulating motor M through a pair of electrical supply wires 35 and 36. The line 35 connects directly to the motor M and the line 36 connects to a motor controlled switch 37 which is connected to the motor M through a wire 38.

The electrical switch 37 and the valve 31 are arranged to be operated simultaneously by a mechanism which is operated by temperature changes in the evaporator in order to control the refrigerating system.

The control mechanism is mounted upon a bracket supporting structure comprising a plate 40 of insulating material which is carried by a pair of brackets 41 attached to the rear casing of the evaporator in any suitable manner. The gas valve 31 is attached to a bracket 43 by means of bolts 44 which also serve to clamp together the valve casing 45 and the head plate 46. The switch 37 is suitably secured to an upstanding portion 48 of the plate 43.

A pressure sensitive bellows 50 is mounted upon the plate 40 on the side thereof remote from the evaporator. The end plate of the bellows is provided with three freezing plugs 51, 52 and 53 which extend through the plate 40 in the direction of the evaporator casing for a purpose to be described more fully hereinafter.

The free end of the bellows is provided with an elongated actuating shaft 54 provided with a reduced extension 55 carrying a thimble element 56 which is provided with two reduced portions 57 and 58 for a purpose to be described hereinafter. The free end of the extension 55 is threaded into an abutment element 59 which is slidably received in a bushing 60 carried by a supporting bracket 61 rigidly attached to the extension 48 of the bracket 43. The element 59 abuts a spring retaining cup 63 against which bears a temperature adjusting spring 64. The spring 64 is also received within a retaining cup 65 which bears against an adjusting arm 66 which is pivotally mounted at 67 on a bracket element 68. The bracket element 68 is rigidly supported upon a bracket 69 carried by the plate 40. The actuating arm 66 abuts against an extension on an adjusting nut 70 which is slidably and nonrotatably mounted in a journal 71 attached to the bracket 68. An adjusting shaft 73 is threadedly engaged with the nut 70 and carries an adjusting knob 74 on the free end thereof which extends through the control panel 27. A supporting bracket 75 for the shaft 73 is attached to the top plate of the evaporator casing.

The switch 37 includes a movable element 77 which is carried by snap-acting mechanism 78 including a portion engaged in the reduced portion 58 of the actuating thimble 56. Movement of the contact element 77 to open circuit position is limited by an upstanding lug 79 which is struck from the bracket 43.

The gas valve is actuated by a bell crank element 80 which is pivotally mounted upon a pair of lugs 81 formed integrally with the bracket 43. The bell crank includes a leaf spring element 82 positioned to contact the valve shaft 83 which passes through a flexible sealing diaphragm 84 clamped between the valve casing 45 and the valve head plate 46. The shaft 83 carries a valve element 85 which is mounted within the valve casing 45 in position to open or close the gas passageway across the valve seat 86. The valve structure also includes a small spring 87 which is positioned to urge the valve element 85 to open position and a spring connection 88 between the valve shaft 83 and the element 85 in order to permit movement of the element 83 after the valve has seated. The gas which is supplied through the conduit 30 passes into the valve chest 45 through a small passageway 90, across the seat 86, and through a passageway 91 into the gas conduit 32 which connects directly to the burner G.

A bi-metallic thermostat 93 is rigidly attached to the lower portion of the plate 40 on the side thereof nearest the evaporator casing. The thermostat 93 is positioned in a slot 94 formed in the plate 40 and carries a latching element 95 on its free end. The latching element 95 is positioned to lock the bell crank 80 in valve-closing position when flexed to the right as viewed in Figure 2. For this purpose the outer portion of the latch element 95 is tapered in order that the bell crank 80 may ride thereover and be latched to the lower end thereof which is in a plane at right angles to the bi-metallic element 93. A suitable stop element 97 is formed on the bracket 43 in order to limit movement of the bi-metallic element to the right as viewed in Figure 2.

The bracket element 69 carries an adjusting nut 100 freely surrounding the shaft 54 and against which bears a defrosting spring 101 also surrounding the shaft 54. The other end of the spring 101 bears against a spring plate 102 which is retained by a cup 103 carried by the bracket 69. The arrangement is such that the plate 102 will be contacted by the thimble element 56 as the bellows collapses a predetermined distance.

The pressure sensitive bellows 50 is also provided with a capillary tube 105 which terminates in a bulb element 106 positioned to be responsive to the temperature of the evaporator.

The operation of the invention is as follows: The bulb-bellows system includes a small quantity of a liquid which will change phase in response to evaporator temperature changes. As the evaporator temperature rises, evidencing a demand for refrigeration, a portion of this liquid vaporizes and thereby increases the pressure in the bellows which then expands against the bias of the adjusting spring 64. Expansive movement of the bellows, which is to be right as viewed in Figure 2, causes the mechanism 78 to snap the switch contact 77 to the right, as viewed in Figure 2, thereby causing the circuit through the wires 36 and 38 to energize the circulating motor M. This movement also rocks the bell crank 80 in a clockwise direction, as viewed in Figure 2, whereby the spring 87 is permitted to urge the valve 85 to open position, thereby energizing the burner G. The refrigerating system then comes into full operation and produces refrigeration to lower the temperature of the evaporator. As the temperature of the evaporator decreases, a portion of the vapor in the bellows valve system condenses until the pressure of the spring 64 is sufficient to collapse the bellows and to actuate the motor switch mechanism to open circuit position and the valve to closed position. The temperatures at which the valve and switch are actuated by the bellows are determined by the degree of compression of the spring 64 which in turn is determined by the setting of the knob 74 which is transmitted through the shaft 73, nut 70, actuating lever 66, to the spring 64. In this manner the evaporator is maintained between predetermined temperature limits, which limits may be varied at will by adjusting the knob 74.

The above described cycling of the refrigerating mechanism continues until such time as the frost coat has built out to a predetermined depth upon the rear wall of the evaporator casing whereupon the bellows 50 collapses to de-energize the refrigerating system and to lock the bell crank 80 beneath the thermostatic element 95 irrespective of the condition of the bulb 106. The refrigerator continues in this position until all frost has been removed in the evaporator casing at which time the bi-metallic thermostat 93 will flex to the left, as viewed in Figure 2, to release the latching engagement with the bell crank 80 to permit the control mechanism to return to normal condition and to re-energize the refrigerating system for further production of refrigeration.

The plug elements 51, 52 and 53 decrease in length and increase in cross-sectional area in the order named. As frost begins to form on the evaporator, it builds out approaching the freezing plug 51, but, due to the heat radiated from that plug, it tends to cup around the plug until there is a certain penetration of the plug into the frost coat but not actual contact therebetween. Eventually the plug 51 will freeze into the frost coat solidly and will thereby provide a good heat transfer path from the bellows, which absorbs heat from the air in the refrigerating compartment, to the frost coat. This will tend to lower the temperature of the unfrozen plugs 52 and 53 and will also slightly lower the temperature of the end plate of the bellows. Further deposit of frost will build out and will approach the plug 52 and will again tend to cup around the same as before though to a lesser extent because very little heat is being radiated from the plug 52 due to the good heat conducting path between the frost coat and the bellows provided by the frozen in plug 51. Eventually the plug 52 will freeze into the frost coat which will then continue to build out until it approaches the plug 53. However, due to the heat conducting path provided by the plugs 51 and 52, the plug 53 will not be radiating heat to the frost coat. Therefore, the frost coat will not cup around the plug 53. The frost will directly contact the end portion of the plug 53. When this condition occurs there are three good heat conducting paths represented by the plugs 51, 52 and 53 between the bellows and the frost coat on the evaporator. Under these conditions, the very large heat conducting path afforded will overbalance the bellows, thereby causing the same to collapse very rapidly irrespective of conditions in the bulb 106 and will actuate the switch to open circuit position and the valve to closed position to de-energize the refrigerating system. The force produced by the bellows under these circumstances is very appreciable and it will collapse with sufficient force to cause the thimble element 56 to engage the spring plate 102 and to compress the spring 101 in order to actuate the bell crank 80 through an arc sufficient to cause the same to engage under the latching element 95. The normal range of movement of the bellows is not sufficient to cause contact between the thimble 56 and the plate 102.

The freezing plugs 51, 52 and 53 operate by overbalancing a previous condition of thermal equilibrium prevailing between the bellows and the frost coat. This is believed to be brought about in the following manner: When the refrigerating system is operating and all the plugs are free of the ice coat, the heat absorbed by the bellows from the refrigerating compartment is radiated from the plugs to the colder evaporator wall or frost coat thereon. Under these conditions the bellows responds solely to the evaporator temperature. When the frost coat freezes around the plug 51, a direct conducting path is afforded between the bellows and the frost coat through which flows a large portion of the heat absorbed by the bellows, thereby decreasing the temperature of the free plugs and the quantity of heat radiated therefrom which decreases the cupping action of the frost around the plug 52. The above described effects are accentuated when the plug 52 freezes in to the extent that the frost will not cup around the plug 53 but will directly contact the end thereof. As the plugs 51 and 52 freeze into the frost coat, the temperature of the end plate of the bellows is lowered but it is not lowered sufficiently to condense the vapor in the bellows, which is receiving heat from the wall of the bellows, or to affect the condition of the bellows as determined by the bulb 106. Once contact has been made between the frost coat and the plug 53, the length of the heat conducting path is decreased and its cross-sectional area is greatly increased. The heat transfer path is now so large that the temperature of the end plate of the bellows is rapidly lowered and the vapor in the bellows is condensed more rapidly than it can be generated by the bulb 106—assuming the evaporator temperature is high enough to generate vapor in the bulb 106—and the bellows forcibly collapses to shift the bell crank 80 into locking engagement with the thermostat 93.

Once the control mechanism is in the defrosting position above described, the temperature of the evaporator will immediately begin to rise. It will eventually rise to such an extent that the frost will melt therefrom. Before the frost coat is entirely removed from the evaporator all of the contact elements 51, 52 and 53 will be entirely freed of the frost coat, and the bellows will tend to expand to operate the control elements to refrigerating mechanism energizing position. This action is prevented because the whole apparatus is locked by the thermostatic element 93. This condition continues until all the frost is removed from the evaporator whereupon the heat radiation from the wall of the evaporator to the thermostat 93 will warm the same sufficiently to cause it to flex to the left, as viewed in Figure 2, which will release the bell crank 80. After release of the bell crank 80, the entire refrigerating control mechanism will return to normal controlling position and the apparatus will cycle as above described under normal conditions.

The present invention provides a mechanism in which a single thermostatic element operates over one range of movement and in response to the temperature conditions prevailing within the evaporator to provide normal control for refrigerating system over an adjustable range determined by a manual setting device and which also operates in response to a very accurately predetermined frost deposition on the evaporator to de-energize the refrigerating system for defrosting purposes regardless of the condition of the evaporator per se and to latch the control mechanism in position to prevent energization thereof until the frost coat has been removed. A separate thermostatic element adjusted to respond only to the evaporator when the same has completely defrosted operates to maintain the control mechanism in de-energized position until the frost coat has been removed completely from the evaporator regardless of conditions which may prevail in the principal thermostatic element. By reason of this construction, the apparatus is placed in the defrosted cycle when the frost depth of the evaporator reaches an exactly predetermined value and the defrosting cycle continues until the frost removal has proceeded to completion.

While I have illustrated and described only one form of my invention, it is to be understood that this is to be taken as illustrative only and not in a limiting sense. Various changes may be made in the form, construction and arrangement of parts without departing from the spirit of the invention or the scope of the appended claims.

I claim:

1. In combination with a refrigerating system including a cooling unit, means for supplying a cooling medium to said cooling unit, and a thermostatic mechanism responsive to the condition of said cooling unit for controlling said cooling medium supply means to maintain said cooling unit between predetermined temperature limits and for rendering said cooling medium supply mechanism inoperative irrespective of the condition of said cooling unit when a predetermined frost coat has formed thereon, and means for holding said thermostatic mechanism in position to render said cooling medium supply means inoperative until said cooling unit has freed itself of frost.

2. In a refrigerating system having an evaporator, means for supplying energy to said system, means to control the supply of energy to said system, a supporting member on said evaporator and in spaced relation thereto, a temperature responsive bellows carried by said supporting member, means for transmitting operative movements of said bellows to said energy supply control means, means normally causing said bellows to respond to the temperature condition of said evaporator, a plurality of heat conducting plugs in heat exchange relation with said bellows projecting through openings in said support toward said evaporator but spaced therefrom, a thermostat mounted on said support positioned to respond to the temperature of said evaporator, a member on said motion transmitting means movable adjacent said thermostat, and means on said thermostat positioned to allow movement of said member to energy supply interrupting position and to restrain return movement thereof until the surface of said evaporator is above the melting temperature of ice.

3. Absorption refrigerating apparatus comprising a generator, a condenser, an evaporator, and an absorber connected in circuit to form a continuous three fluid absorption refrigerating system, power driven means connected in said circuit to circulate a pressure equalizing medium through the evaporator and absorber, a heating element for said generator, thermostatic means normally controlling said heating and circulating means to maintain said evaporator between predetermined temperature limits, and defrosting means including heat transfer means connected to said thermostatic means and adapted to contact frost deposited on said evaporator to move said thermostatic means to a defrosting position, means to lock said thermostatic means in defrosting position, and temperature responsive means adapted to release said latching means in response to a defrosted condition of said evaporator.

4. In combination, a refrigerating system including an evaporator, a control mechanism therefor including means for regulating the production of refrigeration in said evaporator, thermostatic means normally responsive to evaporator temperature conditions for regulating said last-mentioned means, and heat transfer means constructed and arranged to abstract heat from said thermostatic means at a rate greatly in excess of the rate at which heat is supplied thereto by said cooling unit to cause said thermostatic means to operate to discontinue production of refrigeration in said evaporator independently of the temperature condition thereof.

5. The combination of a refrigerating system having an evaporator, a control mechanism for said refrigerating system comprising temperature responsive means normally operable to maintain said evaporator between predetermined temperature limits, and frost depth responsive means constructed and arranged to provide a high rate of heat transfer between said thermostatic means and a frost coat on said evaporator when such coat has reached a predetermined thickness to alter the controlling action of said thermostatic means to allow said evaporator to exceed said predetermined temperature limits to melt said frost coat.

6. Control mechanism comprising a gas valve, an electric switch, a temperature responsive bellows including a bulb element adapted to vary the pressure within the bellows in response to temperature changes to cause said bellows to expand and contract within a predetermined range to actuate said gas valve and switch, heat transfer means in heat exchange relationship with said bellows adapted to cause abnormal movement of such bellows in one direction, and thermostatic means constructed and arranged to latch said apparatus when such abnormal movement has occurred.

7. Refrigerating control mechanism comprising a pressure sensitive bellows, a bulb element connected to said bellows and adapted to cause the same to expand and contract in response to predetermined temperature conditions, and a plurality of heat transfer elements connected to said bellows adapted to overcome the effect of said bulb element and to cause abnormal contraction of said bellows when said heat transfer elements are in contact with a body of low temperature.

8. Refrigerating control mechanism comprising a thermostatic element having a normal range of movement in response to temperature changes, means for altering the limits of said temperature changes, control means connected to be operated by said thermostatic element, and means providing a high conductivity heat transfer path to said thermostatic element for causing said thermostatic element to be moved beyond the limits of the normal range of movement thereof independently of said means for altering the temperature limits thereof in response to a high rate of heat flow through said conducting means.

9. Refrigerating control mechanism comprising a thermostatic element adapted to respond to the temperature of a body to be thermally regulated, means adapted to bring said thermostatic element into a condition of unstable thermal equilibrium with a body of material depositing on the surface of the body to be thermally regulated without interfering with the normal operation of said thermostat, and means adapted to destroy the said thermal equilibrium in a given direction when the deposit of material on said body reaches a predetermined depth.

10. In combination, a cooling unit, means for governing the production of refrigeration in said unit, thermostatic means for operating said governing means, means for causing said thermostatic means to respond to the temperature of said cooling unit, and means responsive to the deposit of a predetermined amount of frost on said cooling unit for causing said thermostatic means to operate said governing means to non-refrigerating position independently of said means for causing said thermostatic means to respond to the temperature of said cooling unit.

11. Refrigerating apparatus comprising a cooling unit, means for supplying a cooling medium to said cooling unit, energization control means movable between predetermined limits to control the energization of said cooling medium supply means, a thermostatic element in heat transfer relationship with said cooling unit connected to operate said energization control means to regulate the temperature of said cooling unit, and means providing an increase in the rate of heat transfer from said thermostatic element to cause said thermostatic element to de-energize said cooling medium supply means for defrosting purposes.

12. Refrigerating apparatus comprising a cooling unit, means for supplying a cooling medium to said cooling unit, energization control means movable between predetermined limits to control the energization of said cooling medium supply means, a thermostatic element having a normal heat exchange relationship with said cooling unit connected to operate said energization control means to regulate the temperature of said cooling unit within a predetermined temperature range, means providing an abnormal heat exchange relationship between said thermostatic element and said cooling unit responsive to a predetermined depth of frost deposit on said cooling unit for causing said thermostatic means to de-energize said cooling medium supply means for defrosting purposes, means for latching said energization control means in defrosting position, and means for releasing said latching means at the end of a defrosting period.

13. Refrigerating apparatus comprising a cooling unit, means for supplying a cooling medium to said cooling unit, energization control means movable between predetermined limits to control the energization of said cooling medium supply means, a thermostatic element connected to operate said energization control means to regulate the temperature of said cooling unit, manually settable means for varying the temperature conditions maintained by said thermostatic means, and heat conducting means for exchanging heat between said thermostatic element and a frost deposit on said cooling unit at a rate sufficient to operate said thermostatic means to de-energize said cooling medium supply means for defrosting purposes.

14. Refrigerating apparatus comprising a cooling unit, means for supplying a cooling medium to said cooling unit, energization control means movable between predetermined limits to control the energization of said cooling medium supply means, a thermostatic element connected to operate said energization control means to regulate the temperature of said cooling unit, and means responsive to a predetermined depth of frost deposit on said cooling unit for causing said thermostatic means to de-energize said cooling medium supply means for defrosting purposes, said frost depth responsive means comprising a plurality of heat transfer elements connected to said thermostatic element and projecting toward said cooling unit, said heat transfer elements decreasing in length as they increase in area.

15. In combination, a cooling unit, means for regulating the production of refrigeration in said cooling unit, a pressure sensitive bellows connected to operate said regulating means, means for varying the pressure within said bellows in response to temperature changes in said cooling unit, and means for altering the pressure in said bellows sufficiently to cause the same to operate said regulating means to discontinue production of refrigeration in said cooling unit in response to a predetermined frost deposit thereon.

16. In combination, a cooling unit, means for regulating the production of refrigeration in said cooling unit, a pressure sensitive bellows connected to operate said regulating means, means for varying the pressure within said bellows in response to temperature changes in said cooling unit, means for altering the operating characteristics of said bellows, and means for altering the pressure in said bellows sufficiently to cause the same to operate said regulating means to discontinue production of refrigeration in said cooling unit in response to a predetermined frost deposit thereon.

17. Refrigerating apparatus comprising a cooling unit, means for supplying a cooling medium thereto, means for controlling said cooling medium supply means comprising a thermostatic element responsive to refrigeration demand, means for adjusting said thermostatic element to regulate the controlling temperature thereof, and means for subjecting said thermostatic element to another controlling condition to the substantial exclusion of refrigeration demand.

18. Refrigerating apparatus comprising a cooling unit, means for supplying a cooling medium thereto, means for controlling said cooling medium supply means comprising a thermostatic element responsive to refrigeration demand, means for adjusting said thermostatic element to regulate the controlling temperature thereof, and means providing a heat transfer path to said thermostatic element sufficient to overcome the effects of refrigeration demand and to cause operation of said thermostatic element in response to the condition of material brought into heat transfer relationship with said heat transfer means.

19. Control mechanism comprising a movable device, a temperature responsive element operatively connected to said movable device and operative to move the same through a normal range of movement, means providing for a high rate of heat exchange with said thermal element to cause the same to operate said movable device to a position beyond said normal range of movement, means for adjusting said temperature responsive means within said normal range without affecting said heat exchange means, means for latching said movable device in fixed position when moved beyond said normal range of movement, and thermostatic means responsive to a predetermined thermal condition of said cooling unit for releasing said latching means.

20. In combination with a refrigerating system including a cooling unit, means for supplying a cooling medium to said cooling unit, a thermostat responsive to the thermal condition of said cooling unit for controlling the operation of said cooling medium supply means to maintain said cooling unit between predetermined temperature limits, and means providing a high rate of heat transfer between said thermostat and frost depositing on said cooling unit to cause said thermostat to render said cooling medium supply means inoperative irrespective of the thermal condition of said cooling unit.

21. Control mechanism comprising an actuating element movable between a plurality of positions, a thermostat arranged to move said actuating element between said positions in response to variations in a first temperature condition, and means having a high heat transfer capacity in heat exchange relationship with said thermostat adapted when subjected to a temperature condition different from said first temperature condition to cause said thermostat to operate said actuating element in response to said different temperature condition independently of said first temperature condition.

22. Control mechanism comprising an actuating element movable between a plurality of positions, a thermostat arranged to move said actuating element between said positions in response to variations in a first temperature condition, means having a high heat transfer capacity in heat exchange relationship with said thermostat adapted when subjected to a temperature condition different from said first temperature condition to cause said thermostat to operate said actuating element in response to said different temperature condition independently of said first temperature condition, and means for adjusting the operation of said thermostat with respect to said first temperature condition without altering the operation thereof with respect to said different temperature condition.

DONALD G. SMELLIE.